United States Patent
Mahajan et al.

(10) Patent No.: US 7,248,686 B2
(45) Date of Patent: Jul. 24, 2007

(54) SYSTEM AND METHOD FOR ROUTING CALLS USING A UNIVERSAL ACCESS PHONE NUMBER

(75) Inventors: Sanjeev Mahajan, Naperville, IL (US); Deborah Lewandowski Barclay, Winfield, IL (US); David S. Benco, Winfield, IL (US); Thomas Lee McRoberts, Naperville, IL (US); Raymond Leroy Ruggerio, Glenview, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/847,177

(22) Filed: May 17, 2004

(65) Prior Publication Data

US 2005/0254638 A1 Nov. 17, 2005

(51) Int. Cl.
*H04M 3/42* (2006.01)

(52) U.S. Cl. .............................. 379/211.02; 379/211.01

(58) Field of Classification Search ........... 379/201.02, 379/211.01, 211.02
See application file for complete search history.

(56) References Cited

U.S. PATENT DOCUMENTS

| | | | | |
|---|---|---|---|---|
| 5,329,578 A | * | 7/1994 | Brennan et al. | 379/211.03 |
| 5,805,688 A | * | 9/1998 | Gillespie et al. | 379/221.08 |
| 6,185,283 B1 | * | 2/2001 | Fuller et al. | 379/88.21 |

* cited by examiner

*Primary Examiner*—Bing Q. Bui

(57) ABSTRACT

A system and method of routing calls made to a called party Universal Access Phone Number (UAPN) in a telecommunications network is provided. The method includes determining the time the call is made, determining the day the call is made, selecting a time/day-phone number for a destination phone number based on the time the call is made and the day the call is made, and routing the call to the called party terminal using the destination phone number. The system selects a time/day-phone number for a destination phone number based on the time the call is made and the day the call is made, and routes the call to the called party terminal using the destination phone number.

11 Claims, 4 Drawing Sheets

FIG. 2

| UAPN | DAY | TIME | TIME/DAY PHONE NUMBER | OVERRIDE PHONE NUMBER |
|---|---|---|---|---|
| 212-555-9999 | MONDAY | 8 a.m. - 9 a.m. | 212-555-1111 | |
| | | 9 a.m. - 5 p.m. | 212-555-2222 | |
| | | 5 p.m. - 6 p.m. | 212-555-1111 | |
| | | 6 p.m. - 8 a.m. | 212-555-3333 | |
| | TUESDAY | 8 a.m. - 9 a.m. | 212-555-1111 | 212-555-3333 |
| | | 9 a.m. - 5 p.m. | 212-555-2222 | 212-555-3333 |
| | | 5 p.m. - 6 p.m. | 212-555-1111 | 212-555-3333 |
| | | 6 p.m. - 8 a.m. | 212-555-3333 | |
| | ⋮ | | | |
| | SUNDAY | 10 a.m. - 2 p.m. | 212-555-1111 | |
| | | 2 p.m. - 10 a.m. | 212-555-3333 | |

SYSTEM AND METHOD FOR ROUTING CALLS USING A UNIVERSAL ACCESS PHONE NUMBER

BACKGROUND OF THE INVENTION

This invention relates to the art of telecommunications and more particularly to a system and method for routing a call in a telecommunications network made to a Universal Access Phone Number.

Many people today have several different telecommunications devices, referred to herein as terminals, such as a home phone, an office phone, a cellular phone, a pager, etc. Typically each of these terminals has a different phone number. As people acquire more phone numbers, and at times discard others, the task of ensuring that they can be reached by others can become complicated. They usually must provide several phone numbers by which they can be contacted when using different terminals at different times. It can then be up to the calling party to determine which number should be called to reach them. Furthermore, when people change services and get a new phone number they may not remember to keep other parties updated.

At times it can be very important for a calling party to have a phone number for immediately contacting the person. For example, daycare providers request a phone number or phone numbers for contacting parents in cases of emergency. However, keeping these numbers current and ensuring that the daycare provider has the phone number most likely to reach a parent at any particular time can be difficult.

It is therefore desirable for a person with several terminals to have a single number capable of contacting their different terminals at different times. It is also desirable for a person using different terminals at different times to have a single number for reaching them at any given time.

SUMMARY OF THE INVENTION

A system and method of routing calls in a telecommunications network using a Universal Access Phone Number (UAPN) is provided.

In accordance with a first aspect of the invention, the method includes determining the time the call is made, determining the day the call is made, selecting a time/day-phone number for a destination phone number based on the time the call is made and the day the call is made, and routing the call to the called party terminal using the destination phone number.

In accordance with a second aspect of the invention, the method includes supplying an override phone number in place of the time/day-phone number and selecting the override phone number for the destination phone number.

In accordance with another aspect of the invention, the system includes means for determining the time the call is made, means for determining the day the call is made, means for selecting a time/day-phone number for a destination phone number based on the time the call is made and the day the call is made, and means for routing the call to the called party terminal using the destination phone number.

In accordance with another aspect of the invention, the system includes means for supplying an override phone number in place of the time/day-phone number and means for selecting the override phone number for the destination phone number.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The invention may take form in various components and arrangements of components, and in various steps and arrangements of steps. The drawings are only for purposes of illustrating preferred embodiments and are not to be construed as limiting the invention. Further, it is to be appreciated that the drawings are not to scale.

FIG. 2 is a table illustrating an example of the information contained in a portion of the UAPN database in accordance with the invention;

DETAILED DESCRIPTION OF THE INVENTION

Figure 1:
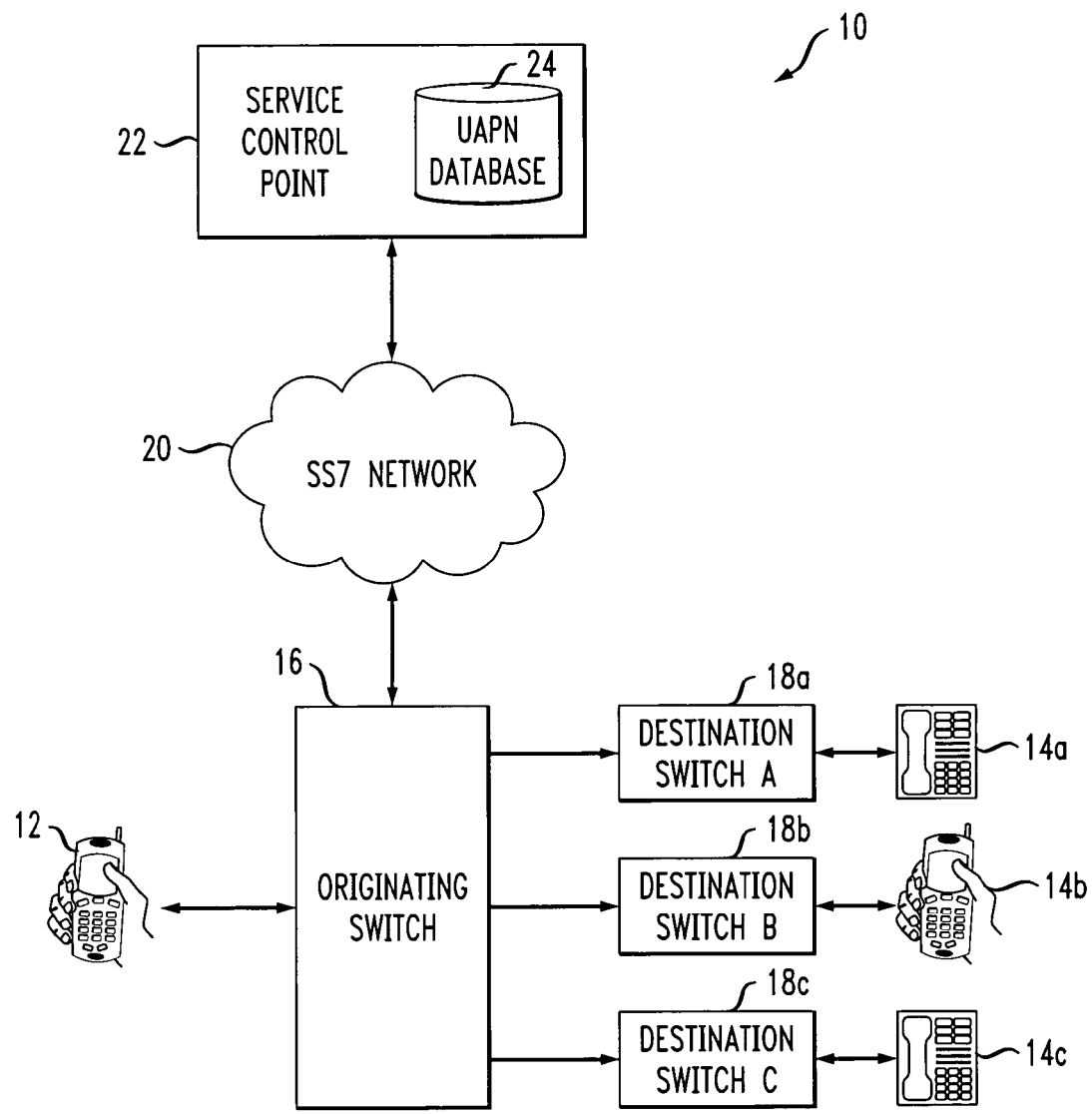
FIG. 1 is a diagrammatic illustration showing an exemplary telecommunications environment suitable for practicing aspects of the present invention.

Referring to FIG. 1, a portion of a telecommunications network is shown generally at 10. The telecommunications network 10 provides communication between a calling party terminal 12 and a called party terminal 14. The called party can also be referred to as a subscriber. The calling party uses the calling party terminal 12 to call the called party who receives the call on the called party terminal 14. The calling party terminal 12 can be a PSTN wireline terminal or a wireless terminal, also known as a cellular phone. Three called party terminals 14a, 14b, and 14c are shown for the purposes of example, however it should be appreciated that the invention can provide communications to any suitable number and different types of called party terminals. The called party terminals 14a, 14b, and 14c can be any suitable telecommunications terminals capable of communicating with the calling party terminal over the telecommunications network 10, including but not limited to, a wireline terminal, a wireless terminal, a pager, a voicemail system, etc. The called party terminals, 14a, 14b, and 14c each have a different destination phone number used for routing incoming calls to these terminals.

The telecommunications network 10 includes an originating switch 16 communicating with the calling party terminal 12. The originating switch can be responsible for call setup, call routing and call teardown. The originating switch 16 can be a switch in a circuit-switched telecommunications network, a switch in a packet-based telecommunications network, a softswitch, a Mobile Switching Center (MSC) in a cellular telecommunications network, or any other suitable switch in a telecommunications network.

The telecommunications network 10 also includes a plurality of destination switches 18a, 18b, and 18c for connecting the call to the called party terminal 14a, 14b, and 14c respectively. The destination switches 18a, 18b, and 18c can be switches in a circuit-switched telecommunications network, switches in a packet-based telecommunications network, softswitches, Mobile Switching Centers (MSCs) in a cellular telecommunications network, or any other suitable switches in a telecommunications network. Some or all of the destination switches 18a, 18b, and 18c can be similar switches or some or all can be different. Though each called party terminal 14 is shown connected to a different destination switch, a plurality of the called party terminals 14 can be connected to the same destination switch 18.

The telecommunications network 10 also includes an Signaling System 7 (SS7) network 20 having a Service Control Point (SCP) 22. The SS7 standard defines the procedures and protocol by which network elements in the telecommunications network 10 exchange information over a signaling network to effect wireless (cellular) and wireline call setup, routing and control. The SCP 22 is provided by a service provider (not shown) and provides an interface to applications including databases.

The SCP 22 includes a UAPN database 24 for resolving the UAPN and providing a destination phone number as described in detail below. The UAPN database 24 can be located on the SCP 22, or it can be physically separate but connected thereto.

Referring now to FIG. 2, a portion of the UAPN database 24 for a single UAPN number, 212-555-9999 shown in column 30, is shown for the purposes of example. It should be appreciated that the UAPN database can store UAPN information for a plurality of different UAPN numbers. For each UAPN number in column 30, the UAPN database 24 can store one or more time/day phone numbers as shown in column 36. The time/day phone number in column 36 can correspond to a time period, as shown in column 34, and a day as shown in column 32. The UAPN database 24 is shown providing times, time/day phone numbers, and override phone numbers for a week of days, of which only three days Monday, Tuesday and Sunday are shown for the purposes of simplicity. The UAPN database can also store override phone numbers as shown in column 38 which can be used as the destination phone number in place of the time/day phone number as described in further detail below.

The called party can supply the UAPN database 24 with the time/day phone numbers for any suitable days of the week and times of the day they wish. Further, the called party can supply an override phone number, such as the number shown in column 38, for any time period and any day they wish. Alternatively, called party can supply an override phone number which is used in place of all of the time/day phone numbers until the override phone number is removed and/or disabled.

The called party can supply the UAPN database 24 with the time/day and override phone numbers in any suitable manner. For example, the called party can use an internet connection to the service provider's website. The website can prompt the called party to enter the time and date information as well as the destination phone numbers including any override numbers they wish to supply. The information can then be downloaded to the UAPN database 24. In another example, the called party can contact the service provider such as by calling a representative thereof, and provide this information verbally or using their terminal. The service provider can then enter this information into the UAPN database 24. In another example, the called party can provide this information to the UAPN database 24 using a web enabled wireless phone.

The originating switch 16 sends signaling messages to other switches to setup, manage, and release voice circuits required to complete a call. The originating switch 16 also sends a query message to the SCP 22 to determine how to route the call to the called party terminal 14 and the SCP sends a response back to the originating switch containing the destination phone number associated with the intended called party terminal as shall be described in further detail below.

The destination switch examines the dialed number, determines that it serves the called party, and that the line is available for ringing. The destination switch rings the called party line and transmits an ISUP address complete message (ACM) to the originating switch to indicate that the remote end of the trunk circuit has been reserved.

The operation of the invention shall be described using an example, which should not be considered limiting, and a series of method steps. The called party or subscriber has a UAPN which is known by the service provider operating at least portions of the telecommunications network 10 including the SCP 22. For this example, the called party UAPN is 212-555-9999 as shown in column 30 of the UAPN database 24 shown in FIG. 2. Typically, the called party commutes from home to work between 8 a.m. and 9 a.m. and from work to home between 5 p.m. and 6 p.m. each weekday. During these times, the called party wants calls made to the UAPN to be routed to their cellular phone, such as for example terminal 14b, having the destination phone number 212-555-1111. Accordingly, the called party supplies this phone number for the time/day phone number in column 36 for these times and days as is shown.

During the called party's working hours, 9 a.m. to 5 p.m., the called party wants calls made to the UAPN to be routed to the destination phone number 212-555-2222 associated with a work wireline phone terminal, such as for example terminal 14c. Therefore, the called party supplies this destination phone number for the time/day phone number in column 36 for these times and days as is shown. The called party is typically at home between 6 p.m. and 8 a.m. most weekdays and Saturday morning and wants calls made to the UAPN to be routed to the destination phone number 212-555-3333 associated with a home phone, such as for example terminal 14a. The called party supplies this destination phone number for the time/day phone number in column 36 for these times and days as is shown.

Further, for the purposes of example, the called party is sick on Tuesday and stays at home. Therefore, the called party supplies an override number, that of the home phone number 212-555-3333, for replacing the time/day phone numbers for Tuesday 8 a.m. to 6 p.m. As a result, calls made to the UAPN during these times are routed to the override number instead of the time/day phone number. It should be appreciated that the invention can enable the called party to supply an override number for specific time periods as described, or alternatively the called party can supply an override number which remains effective for replacing all time/day phone numbers until it is removed and/or made ineffective.

Figure 3:
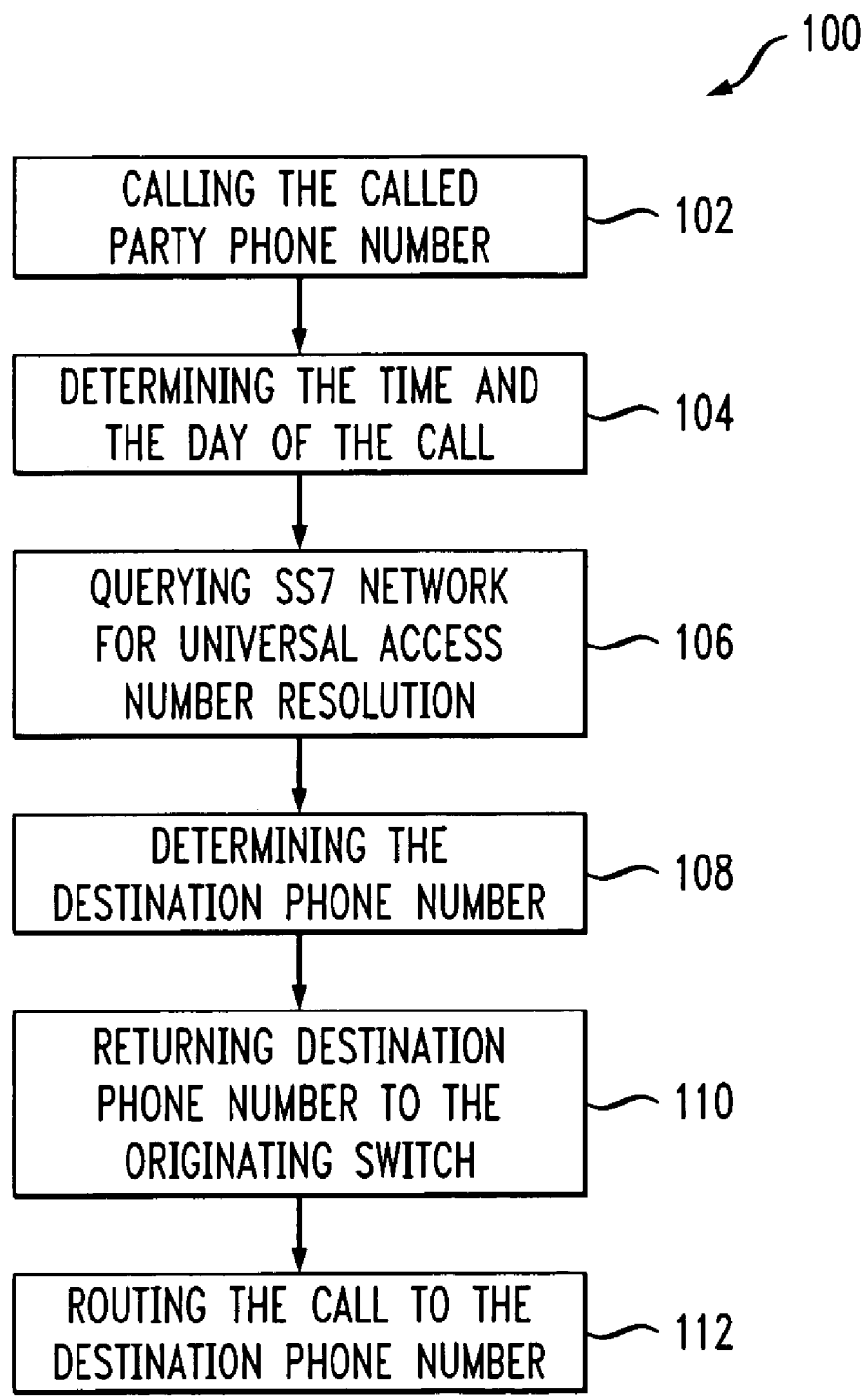
FIG. 3 is a flow chart illustrating a method of routing a call made to the UAPN in accordance with the invention.
Figure 4:
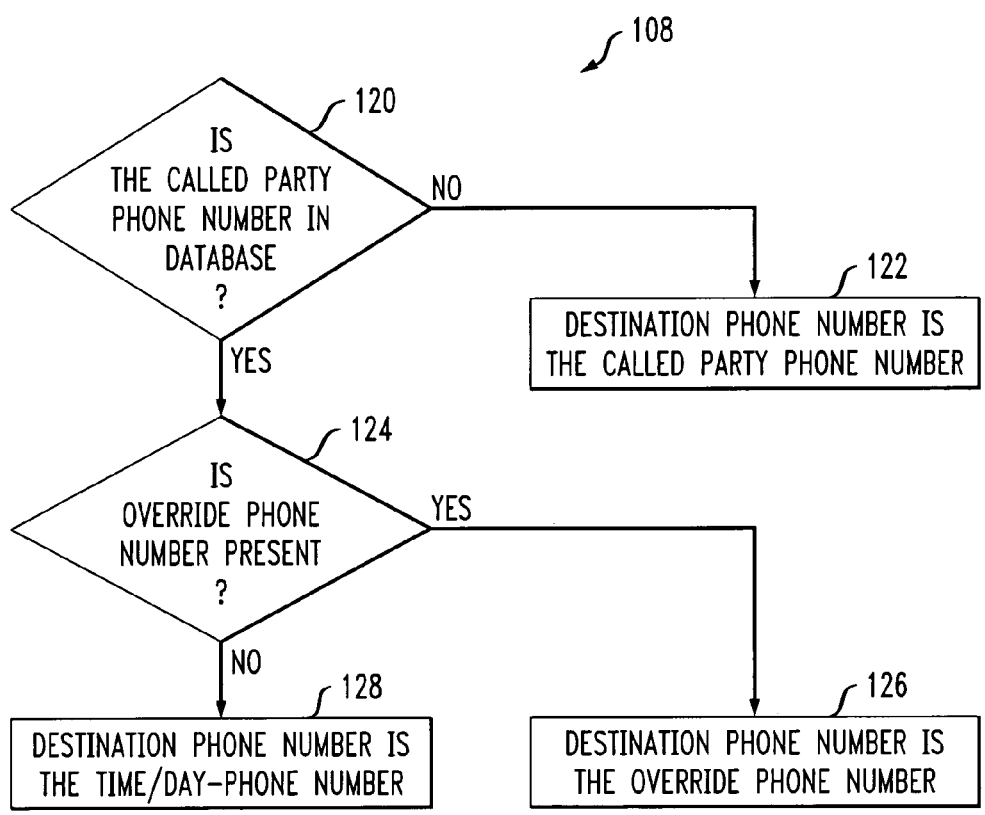
FIG. 4 is a flow chart illustrating a method of determining the destination phone number from the UAPN in accordance with the invention.

Referring now to FIGS. 3 and 4, a method of routing a call in a telecommunications network using a Universal Access Phone Number (UAPN) is shown generally at 100. The method 100 includes calling a called party phone number at 102. The called party phone number can be the UAPN. Alternatively, the called party phone number may not be a UAPN. The called party phone number called by the calling party at step 102 is sent to the originating switch 16 which is responsible for routing the call to the called party terminal 14. In the example provided herein, the calling party calls the called party U.A. Pat. No. 212-555-9999 on Monday at 8:30 a.m.

The method 100 also includes determining the time that the call is made and the day of the week that the call is made, also referred to as the time/day information, at 104. The originating switch 16 can determine the time/day information, or the SCP 22 can determine the time/day information. The time/day information can be determined in any suitable known manner such using the processor clock and date functions available in the operating system. In the example provided herein, the day the call is made is determined to be Monday and the time the call is made is determined to be 8:30 a.m.

The method 100 also includes querying the SS7 network for UAPN resolution at 104. The query is sent from the originating switch 16 to the SCP 22 which includes the UAPN database 24. The query can be made using a new call control command or commands using any suitable protocol. An example, which should not be considered limiting, includes a new ISDN User Part (ISUP) protocol UAPN Resolution Message (URM) query calling for UAPN resolution. The query includes the called party phone number dialed by the calling party in step 102. When the time/day information is determined by the originating switch in step 104, that information can be sent to the SCP 22 such as by including it in the query of step 106. When the time/day information is determined by the SCP 22, it can be determined before the query of step 106 as shown in FIG. 3, or it can be determined during the query step of 106, or after it with the query step of 106 preceding step 104.

The method 100 also includes resolving the UAPN by determining the destination phone number of the called party terminal 14 at 108. Referring now to FIG. 3, the step of determining the destination phone number at 108 is shown in detail. The SCP 22 determines the destination phone number using the UAPN database. At step 120, the SCP 22 determines whether the called party phone number dialed by the calling party in step 102 is in the UAPN database 24. If the called party phone number is not a UAPN in the UAPN database, the destination phone number is determined, at 122, to be the called party phone number dialed by the calling party in step 102. If the called party phone number is a UAPN in the UAPN database at 120, the SCP determines whether an override number is present for the day and the time the call is made at 124. If an override number is present, the destination phone number is determined to be the override number at 126.

If an override number is not present for the day and the time the call is made at 124, the destination phone number is determined to be the time/day-phone number at 128 for the time and the day of the week that the call is made. In the example provided herein, the UAPN dialed in step 102 is found in the UAPN database 24 at step 120 and no override number is present for Monday at 8:30 a.m. Therefore, the destination phone number is determined to be the time/day-phone number 212-555-1111.

Referring again to FIG. 2, the method also includes returning the destination phone number to the originating switch at 110. The destination phone number can be returned in an answer to the query sent in step 104 using any suitable protocol. In the example provided, the destination phone number 212-555-1111 is returned to the originating switch 16.

The method also includes routing the call to the called party terminal 14 using the destination phone number at 112. The call is routed from the originating switch 16 to the destination switch 18 corresponding to the called party terminal 14 having the destination phone number. The call is routed in any suitable known manner and may be routed to one or more intermediate switches (not shown) before reaching the destination switch 18. The call may be routed across a PSTN network, a wireless communications network (also known as a cellular network) or any other known telecommunications network including a combination of more than one of these networks. In the example provided herein, the call is routed to the wireless called party terminal 14b having the phone number 212-555-1111.

In the example provided, if the call is made on Tuesday at 8:30 a.m. in step 102, the override number is found to be present in step 124 and the destination phone number is determined to be the override phone number 212-555-3333. Accordingly, the call is routed to the called party's home phone instead of the called party's wireless phone.

The invention enables a subscriber to give out a single phone number, the UAPN, to potential calling parties which can be routed to any terminal the subscriber desires. Further, the invention enables the subscriber to choose the terminal the UAPN is routed to according to the day of the week and the time of the day that the call is made. The subscriber can easily override the time/day phone number by supplying an override phone number to be used in place of the time/day phone number. If they so wish, the subscriber may only give the UAPN number to a select group, a group who will be able to reach the subscriber at any time. The subscriber can still give out the phone numbers for the subscriber's specific phones to other groups, thereby restricting these groups to being able to reach them at only that corresponding terminal.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of routing a call from a calling party made to a called party Universal Access Phone Number (UAPN) in a telecommunications network comprising:

supplying a UAPN:

supplying different time/day phone numbers different than the UAPN for specific times of the day and/or days of the week the time/day phone numbers including a first time/day phone number corresponding to a first time period and a first day associating the time/day phone numbers with the UAPN in the telecommunications network;

supplying an override phone number for the first time period and first day, the override phone number being different than the first time/day phone number UAPN;

receiving a call destined for the called party during the first time period and first day at an originating switch serving the calling party;

the originating switch querying an SS7 network for UAPN number resolution;

receiving the query at a Service Control Point (SCP) via the SS7 network;

the SCP selecting the override phone number as a destination phone number returning the destination phone number to the originating switch via the SS7 network; and the originating switch routing the call to the called party terminal using the destination phone number.

2. The method defined in claim 1 wherein the query is an ISDN User Part (ISUP) protocol UAPN Resolution Message (URM) query calling for UAPN resolution.

3. The method defined in claim 1 further comprising:

the originating switch determining the time and day the call is being made; and the query sent to the SCP includes the time and day the call is being made.

4. The method defined in claim 1 further comprising:

the SCP determining the determining the time and day the call is being made.

5. The method defined in claim 1 further comprising supplying a plurality of different override phone numbers associated with the UAPN for different times and/or days.

6. The method defined in claim 1 wherein the override phone number corresponds to a plurality of different time periods.

7. The method defined in claim 1 wherein the override phone number corresponds to a plurality of different days.

8. The method defined in claim 1 further comprising storing the UAPN, the time/day phone numbers and the override phone number in a database on the telecommunications network.

9. The method defined in claim 8 further comprising the called party storing the override phone number.

10. The method defined in claim 8 further comprising a telecommunications network service provider storing the override phone number.

11. A system for routing a call from a calling party made to a called party Universal Access Phone Number (UAPN) in a telecommunications network comprising:

an originating switch serving the calling party receiving a call destined for the called party; and a Service Control Point (SCP) connected to the originating switch via an SS7 network, the SCP having a UAPN database including different time/day phone numbers for specific times of the day and/or days of the week corresponding to the same called party UAPN the time/day phone numbers including a first time/day phone number corresponding to a first time period and a first day, the UAPN database further including an override phone number for the first time period and first day, the override phone number being different than the first time/day phone number UAPN, wherein the SCP receives a UAPN resolution query from the originating switch during the first time period and first day, determines that the called party phone number is in a UAPN database, selects the override phone number for a destination phone number based on the time the call is made and the day the call is made, and returns the destination phone number to the originating switch via the SS7 network for enabling the originating switch to route the call to the called party terminal using the destination phone number.

* * * * *